United States Patent Office 3,320,247
Patented May 16, 1967

3,320,247
PHENTHIAZINE COMPOUNDS
Herbert Arnold and Rolf Rebling, Bielefeld, Norbert Brock, Uber Bielefeld, and Hans-Dieter Lenke, Bielefeld, Germany, assignors to Asta-Werke AG, Chemische Fabrik, Brackwede, Germany, a corporation of Germany
No Drawing. Filed Feb. 10, 1965, Ser. No. 431,712
Claims priority, application Germany, Feb. 28, 1964, A 45,348
13 Claims. (Cl. 260—243)

The present invention is related to new phenthiazine compounds.

It is an object of the present invention to provide new phenthiazine derivatives having improved pharmacological properties.

Further objects of the present invention and advantages thereof will become apparent as the description proceeds.

The new phenthiazine derivatives according to the present invention corresponds to the following general Formula I

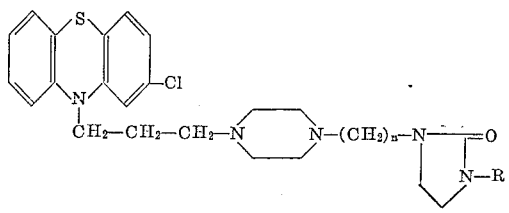

wherein R is a member selected from the group consisting of methyl and ethyl and $n$ is a numeral selected from the group consisting of 2 and 3 and preferably is 2, and salts thereof with pharmacologically acceptable acids. The preferred salts are the hydrochlorides.

The new compounds may be produced in accordance with the present invention by the following N-alkylating methods:

(A) Subjecting a phenthiazine derivative of the general Formula II

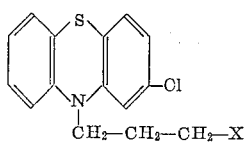

wherein X is the residue of a reactive ester, preferably halogen or the residue of a sulphuric or sulphonic acid ester, to reaction with an imidazolidone derivative of the general Formula III

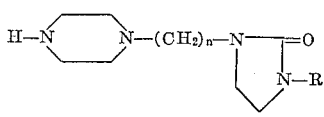

wherein R and $n$ have the same meaning as in the general Formula I;

(B) Subjecting 3-chloro-phenthiazine to reaction with an imidazolidone derivative of the general Formula IV

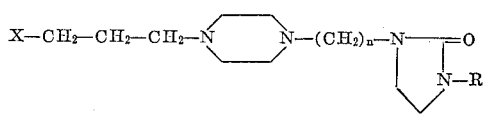

wherein R and $n$ have the same meaning as in the general Formula I and X has the same meaning as in the general Formula II;

(C) Subjecting a phenthiazine derivative of the general Formula V

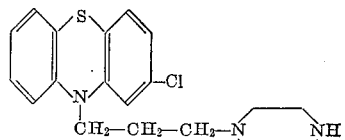

to reaction with an imidazolidine derivative of the general Formula VI

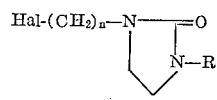

wherein $n$ and R have the same meaning as in the general Formula I and Hal is a halogen.

The process according to the present invention may be preferably carried out in the presence of an inert organic solvent such as for instance an aromatic hydrocarbon, preferably toluene or xylene, or an ether, preferably dioxane. Depending upon the nature of the reaction components preferably triethylamine is used as the necessary acid binding agent or an alkali metal derivative such as for instance sodium amide is used as condensing agent. The reaction is carried out at an elevated temperature, such as the boiling point of the applied solvent.

The imidazolidone derivatives of the general Formulas III and IV which are used as starting materials in the processes according to the present invention are not known in the prior art. They may be obtained by subjecting an oxazolidone to reaction with an isocyanate according to the following equation

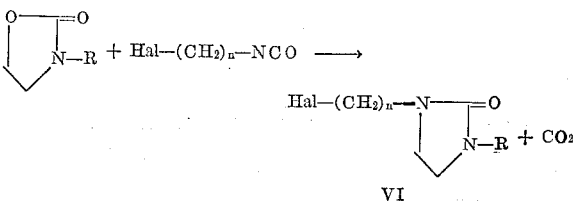

wherein R and $n$ have the same meaning as in the above general Formula I and Hal is a halogen atom, preferably a chlorine atom, according to copending application Serial No. 388,983, filed on August 5, 1964, and entitled "Process for the Production of Imidazolidones," and subjecting the 1-alkyl-3-(ω-halogenoalkyl)-imidazolidones VI thus obtained in manners known per se to reaction with piperazine to yield compounds of the general Formula III, or, respectively, with mono-substituted piperazines to compounds of the general Formula IV. In place ow piperazine, a mono-N-carboxy-piperazine of the Formula VII

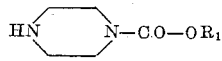

wherein $R_1$ is an alkyl group, preferably a lower alkyl group, may be used as reaction component; in this case, the carbalkoxy group has to be split off before the compound is further reacted. The phenthiazine derivative of the general Formula V may be obtained for instance according to the published German patent application DAS 1,037,461 by subjecting 3-chloro-10-(γ-chloropropyl)-phenthiazine to reaction with piperazine. In this case, too, a mono-N-carbalkoxy-piperazine of the Formula VII may be used in place of piperazine whereafter the carbalkoxy group is split off in the resulting product in manners known per se.

The process according to the present invention is illustrated by the following examples wherein the compounds are named according to the nomenclature used in Beilstein's Handbuch der Organischen Chemie (Handbook of Organic Chemistry).

Example 1.—N-[β-(1-methyl-2-oxo-imidazolidyl)-ethyl]-piperazine 32.5 g. of 1-methyl-3-β-chloroethyl-imidazolidone-(2) are dissolved in 200 cc. of dioxane. After having added thereto 31.6 g. of mono - N - carbethoxy-piperazine and 20.2 g. of triethylamine, the reaction mixture is heated to boiling under reflux for 8 hours. Thereafter, the precipitated triethylamine hydrochloride is filtered off and the dioxane is distilled off in a vacuo. The residue is distilled in a high vacuo. B.P.$_{0.01\ mm.}$: 203–207° C. Yield: 45 g. (79.11% of the theoretical).

30 g. of the thus obtained N-[1-methyl-imidazolidone-(2)-ethyl-(3)]-N'-(carbethoxy)-piperazine are dissolved in 250 cc. of a 10% alcoholic solution of potassium hydroxide and heated to boiling under reflux for 15 hours. The precipitated potassium carbonate is filtered off and the alcohol is distilled off on a steam bath. The residue is treated with a 40% aqueous solution of sodium hydroxide and the thus separating oil is extracted several times with benzene. The combined benzene extracts are dried over potassium carbonate and are evaporated on a steam bath. The resulting residue is distilled in a high vacuo. 16 g. of N-[β-(1 - methyl-2-oxo-imidazolidyl)-ethyl]-piperazine are obtained. Yield: 71.15% of the theoretical.

The homologous compounds are produced in an analogous manner.

The physical data of these compounds are given in the following Table 1:

TABLE 1

| Compound | B.P. | $n_D$ |
|---|---|---|
| N-[β-(1-methyl-2-oxoimidazolidyl)-ethyl]-piperazine | B.p.$_{0.01\ mm.}$: 155–158° C. | $n_D^{22}$: 1.5153 |
| N-[β-(1-ethyl-2-oxoimidazolidyl)-ethyl]-piperazine | B.p.$_{0.01\ mm.}$: 160–165° C. | $n_D^{22}$: 1.5111 |
| N-[γ-(1-methyl-2-oxoimidazolidyl)-n-propyl]-piperazine | B.p.$_{0.02\ mm.}$: 165–170° C. | $n_D^{21}$: 1.5140 |
| N-[γ-(1-ethyl-2-oxoimidazolidyl)-n-propyl]-piperazine | B.p.$_{0.01\ mm.}$: 168–170° C. | |

The yields range between 65 and 72% of the theoretical.

Example 2.—3-chloro-10-[1'-(1''-methyl-2''-oxo-3''-ethyl-imidazolidyl)-4'-piperazino-n-propyl]-phenthiazine 23 g. of 3-chloro-10-(γ-chloropropyl)-phenthiazine are dissolved in 100 cc. of dioxane and 15.36 g. of N-[β-(1-methyl-2-oxo-imidazolidyl)-ethyl]-piperazine obtained according to Example 1 and 7.49 g. of triethylamine are added thereto. The mixture is heated to boiling under reflux for 12 hours. After cooling, the precipitated triethylamine hydrochloride is filtered off and the solvent is distilled off in a vacuo. The resulting residue is mixed with ether, the ethereal layer is washed several times with water and finally dried over potassium carbonate. After having distilled off the ether, the resulting residue is fractionated in a high vacuo. Thus, the 3-chloro-10-[1'-(1''-methyl-2''-oxo-3''-ethyl - imidazolidyl) - 4' - piperazino-n-propyl]-phenthiazine base is obtained. B.P.$_{0.01\ mm.}$: approx. 260° C. Yield: 18.5 g. (51.33% of the theoretical).

For preparing the dihydrochloride, the distilled base is dissolved in anhydrous ether and ethereal hydrogen chloride is added to this solution with cooling. The precipitated dihydrochloride is filtered off and preferably recrystallized from dioxane or acetone mixed with a small amount of methanol. F.: 255° C.

Example 3.—3-chloro-10-[1'-(1''-ethyl-2''-oxo-3''-ethyl-imidazolidyl)-4'-piperazino-n-propyl]-phenthiazine 22 g. (0.071 mol) of 3-chloro-10-(γ-chloropropyl)-phenthiazine are dissolved in 100 cc. of dioxane and 16.05 g. (0.071 mol) of N-[β(1-ethyl - 2 - oxo-imidazolidyl)-ethyl]-piperazine and 7.17 g. (0.071 mol) of triethylamine are added thereto. The mixture is heated to boiling under reflux for 16 hours. The N-[β-(1-ethyl-2-oxo-imidazolidyl)-ethyl]-piperazine has been prepared as described in Example 1 from 1-ethyl-3-β-chloroethyl-imidazolidone-(2) and mono-N-carbethoxy-piperazine.

The reaction mixture is worked up as described in Example 2. Thus, 3-chloro-10-[1'-(1''-ethyl-2''-oxo-3''-ethyl-imidazolidyl)-4'-piperazino-n-propyl] - phenthiazine base is obtained. B.P.$_{0.01\ mm.}$: 260–265° C. Yield: 19 g. (53.57% of the theoretical).

For preparing the dihydrochloride, the base is dissolved in anhydrous ether and ethereal hydrogen chloride is slowly added to this solution while cooling. The precipitated dihydrochloride is filtered with suction and preferably recrystallized from dioxane or a mixture consisting of acetone and a small amount of methanol. F.: 215–216° C.

Example 4.—3-chloro-10 - [1' - (1''-methyl-2''-oxo-3''-n-propyl - imidazolidyl) - 4' - piperazino-n-propyl]-phenthiazine 24.8 g. (0.08 mol) of 3-chloro-10-γ-chloropropyl)-phenthiazine are dissolved in 100 cc. of dioxane and 18 g. (0.08 mol) of N-[γ-(1-methyl - 2 - oxo-imidazolidyl)-n-propyl]-piperazine and 8.1 g. (0.08 mol) of triethylamine are added thereto. The mixture is heated to boiling under reflux for 12 hours. The N-[γ-(1-methyl-2- oxo-imidazolidyl)-n-propyl]-piperazine has been prepared as described in Example 1 from 1-methyl-3-γ-chloro-n-propyl-imidazolidone-(2) and mono-N-carbethoxy-piperazine.

The reaction mixture is worked up as described in Example 2. Thus, the 3-chloro-10[1'-(1''-methyl-2''-oxo-3''-n-propyl - imidazolidyl)-4'-piperazino-n-propyl]-phenthiazine base is obtained.

B.P.$_{0.016\,mm.}$: 265–270° C. Yield: 19 g. (47.49% of the theoretical).

For preparing the dihydrochloride, the base is treated with ethereal hydrogen chloride as described in Example 1 and recrystallized from a mixture of acetone and methanol. F.: 233° C.

*Example 5.—3-chloro-10-[1'-(1''-ethyl-2''-oxo-3''-n-propyl-imidazolidyl)-4'-piperazino-n-propyl]-phenthiazine*

24 g. (0.077 mol) of 3-chloro-10-(γ-chloropropyl)-phenthiazine are dissolved in 100 cc. of dioxane and 18.60 g. (0.077 mol) of N-[γ-(1-ethyl-2-oxo-imidazolidyl)-n-propyl]-piperazine and 7.82 g. (0.077 mol) of triethylamine are added thereto. The mixture is heated to boiling under reflux for 12 hours. The N-[γ-(1-ethyl-2-oxo-imidazolidyl)-n-propyl]-piperazine has been prepared as described in Example 1 from 1-ethyl-3-γ-chloro-n-propyl-imidazolidone-(2) and mono-N-carbethoxy - piperazine.. The separation and purification of the 3-chloro-10-[1'-(1''-ethyl-2''-oxo-3'' - n - propyl - imidazolidyl)-4'-piperazino-n-propyl]-phenthiazine base is carried out as described in Example 2.

B.P.$_{0.01\,mm.}$: approx. 270° C. Yield: 22 g. (55.30% of the theoretical).

For preparing the dihydrochloride, the base is treated with ethereal hydrogen chloride as described in Example 2 and is recrystallized from a mixture of acetone and methanol. F.: 225° C.

The dimaleate is obtained as follows:

7 g. of the base are dissolved in acetone. A solution of 5 g. of maleic acid anhydride (excess) in a small amount of water is added thereto and the mixture is allowed to stand over night. The precipitated crystals may be recrystallized from ethanol. F.: 166° C. Yield: 6 g. (69.95% of the theoretical).

The phenthiazine derivatives of the general Formula I according to the present invention are pharmacologically interesting particularly because of their strong psychosedative and antiemetic effectiveness which in comparison to known psychosedatives and antiemetics is improved to a surprisingly high extent.

The following compounds have been subjected to the following pharmacological tests a–d:

(1) 3-chloro-10[1'-(1''-methyl-2''-oxo-3''-ethyl-imidazolidyl)-4'-piperazino-n-propyl] - phenthiazine according to Example 2;

(2) 3-chloro-10-[1'-(1''-ethyl-2''-oxo-3''-ethyl - imidazolidyl)-4'-piperazino-npropyl]phenthiazine according to Example 3.

(a) The test compounds were administered subcutaneously to rats for testing their sedative effectiveness. The test animals were regarded as sedated if they showed neither spontaneous mutility nor are caused to move by weak mechanical stimulus (by pushing) (Table 2).

TABLE 2.—SEDATIVE EFFECTIVENESS ON RATS; S. C.

| Test Compound No. | DE 95 (μmol./kg.) |
|---|---|
| 1 | 2.2 |
| 2 | 5.4 |

(b) The narcosis prolonging effectiveness has been tested on mice. The test compounds were administered to the test animals intraperitoneally and 30 minutes after the intravenous administration of 68 mg./kg. of hexobarbital-Na. The reappearance of the retrogate reflex was used as the time of termination of the narcosis (Table 3).

TABLE 3.—NARCOSIS PROLONGING EFFECTIVENESS ON MICE; I.P.

| Test Compound No. | Dose [1] (μmol./kg.) |
|---|---|
| 1 | 3.4 |
| 2 | 3.7 |

[1] Dose effecting a 100% prolongation of the duration of narcosis.

(c) In order to examine the hypothermic effectiveness of the compounds on rats, the dose which produced an average decrease of the normal body temperature for −1.0° C. after subcutaneous application was determined (Table 4).

TABLE 4.—HYPOTHERMIC EFFECTIVENESS ON RATS; S.C.

| Test Compound No. | DE −1.0° C. (μmol./kg.) |
|---|---|
| 1 | 1.1 |
| 2 | 1.9 |

(d) The antiemetic effectiveness was tested on dogs after the administration of apomorphine. The animals were regarded as protected if 30 minutes after the subcutaneous injection of the test compounds no vomiting was caused by intramuscular administration of 0.05 to 0.07 mg./kg. of apomorphine (Table 5).

TABLE 5.—ANTIEMETIC EFFECTIVENESS ON DOGS; S.C.

| Test Compound No. | DE 95 (μmol./kg.) |
|---|---|
| 1 | 0.143 |
| 2 | 0.096 |

The toxicity tests on rats (s.c.) showed that all of the test compounds have a rather low toxicity.

TABLE 6.—TOXICITY

| Test Compound No. | DL 50+ (μmol./kg.) |
|---|---|
| 1 | 1,156 |
| 2 | 1,188 |

+ Seven days test.

From these toxicity values the therapeutic index regarding the sedative and the antiemetic effectiveness may be calculated as follows:

TABLE 7.—THERAPEUTIC INDEX

| Test Compound No. | Therapeutic Index (DL 50/DE 95) | |
|---|---|---|
| | Sedative Effectiveness on Rats, s.c. | Antiemetic Effectiveness on Dogs, s.c. |
| 1 | 525 | 8,080 |
| 2 | 220 | 12,380 |

What we claim is:

1. A compound selected from the group consisting of the phenthiazine derivative of the Formula I

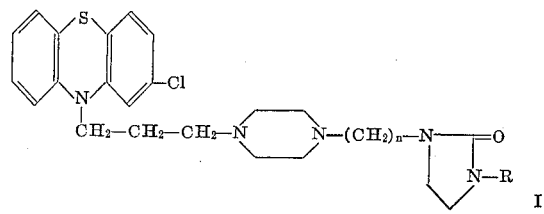

wherein R is a member selected from the group consisting of ethyl and methyl and $n$ is a numeral selected from the group consisting of 2 and 3, and the salt thereof with a pharmacologically acceptable acid.

2. A compound selected from the group consisting of 3-chloro-10-[1'-(1''-methyl-2'' - oxo - 3''-ethyl-imidazolidyl)-4'-piperazino-n-propyl]-phenthiazine and the salt thereof with a pharmacologically acceptable acid.

3. A compound selected from the group consisting of 3-chloro-10-[1'-(1''-ethyl-2'' - oxo - 3''-ethyl-imidazolidyl)-4'-piperazino-n-propyl]-phenthiazine and the salt thereof with a pharmacologically acceptable acid.

4. A compound selected from the group consisting of 3-chloro-10-[1'-(1''-methyl-2'' - oxo - 3''-n-propyl-imidazolidyl)-4'-piperazino - n - propyl]-phenthiazine and the salt thereof with a pharmacologically acceptable acid.

5. A compound selected from the group consisting of 3-chloro-10-[1'-(1''-ethyl-2'' - oxo - 3''-n-propyl-imidazolidyl)-4'-piperazino - n - propyl]-phenthiazine and the salt thereof with a pharmacologically acceptable acid.

6. 3 - chloro - 10 - [1' - (1'' - methyl - 2'' - oxo - 3''- ethyl - imidazolidyl) - 4' - piperazino - n - propyl] - phenthiazine.

7. 3 - *chloro* - 10 - [1'-(1''-ethyl - 2'' - oxo - 3'' - ethyl- imidazolidyl)-4'-piperazino-n-propyl]-phenthiazine.

8. 3 - chloro - 10 - [1' - (1'' - methyl - 2'' - oxo - 3''- n - propyl - imidazolidyl) - 4' - piperazino - n - propyl]- phenthiazine.

9. 3 - chloro - 10 - [1' - (1'' - ethyl - 2'' - oxo - 3'' - n- propyl - imidazolidyl) - 4' - piperazino - n - propyl]-phenthiazine.

10. 3 - chloro - 10 - [1' - (1'' - methyl - 2'' - oxo - 3''- ethyl - imidazolidyl) - 4' - piperazino - n - propyl] -phenthiazine dihydrochloride.

11. 3 - chloro - 10 - [1' - (1''- ethyl - 2'' - oxo - 3''- ethyl - imidazolidyl) - 4' - piperazino - n - propyl] - phenthiazine dihydrochloride.

12. 3 - chloro - 10 - [1' - (1'' - methyl - 2'' - oxo-3''- n - propyl - imidazolidyl) - 4' - piperazino - n - propyl]- phenthiazine dihydrochloride.

13. 3 - chloro - 10 - [1' - (1'' - ethyl - 2'' - oxo - 3''- n - propyl - imidazolidyl) - 4' - piperazino - n - propyl]- phenthiazine dihydrochloride.

No references cited.

WALTER A. MODANCE, *Primary Examiner.*

HARRY I. MOATZ, *Assistant Examiner.*